(12) United States Patent
Nam et al.

(10) Patent No.: US 10,179,611 B2
(45) Date of Patent: Jan. 15, 2019

(54) HOOD FOR VEHICLE AND MANUFACTURING METHOD OF THE SAME

(71) Applicants: HYUNDAI MOTOR COMPANY, Seoul (KR); KIA Motors Corporation, Seoul (KR); IUCF-HYU (Industry-University Cooperation Foundation Hanyang University), Seoul (KR)

(72) Inventors: Byeung Gun Nam, Yongin-si (KR); Jae Young Lim, Seongnam-si (KR); Hak Sung Kim, Seoul (KR); Do Hyoung Kim, Gwangmyeong-si (KR); Ku Hyun Jung, Hwaseong-si (KR); In Gyu Lee, Suwon-si (KR); Dong Hyun Kim, Suwon-si (KR); Dug Joong Kim, Seoul (KR)

(73) Assignees: HYUNDAI MOTOR COMPANY, Seoul (KR); KIA MOTORS COMPANY, Seoul (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 15/377,531

(22) Filed: Dec. 13, 2016

(65) Prior Publication Data

US 2018/0093713 A1  Apr. 5, 2018

(30) Foreign Application Priority Data

Oct. 4, 2016 (KR) .................. 10-2016-0127356

(51) Int. Cl.
*B62D 25/10* (2006.01)
*B29C 70/30* (2006.01)
(Continued)

(52) U.S. Cl.
CPC ............ *B62D 25/105* (2013.01); *B29C 70/30* (2013.01); *B60R 21/34* (2013.01); *B62D 25/12* (2013.01);
(Continued)

(58) Field of Classification Search
CPC ...... B62D 25/10; B62D 25/105; B62D 29/04; B62D 29/043
(Continued)

(56) References Cited

U.S. PATENT DOCUMENTS

2009/0053458 A1* 2/2009 Birrell .................. B62D 25/105
428/68
2018/0037273 A1* 2/2018 Aarts .................... B62D 29/043

FOREIGN PATENT DOCUMENTS

DE  102012023326 A1 * 6/2014 ........... B62D 29/043
DE  102013224927 A1 * 6/2015 ............. B32B 27/08
(Continued)

OTHER PUBLICATIONS

English translation of JP 2014-201110; retreived Mar. 1, 2018 via J Plat Pat located at https://www.j-platpat.inpit.go.jp/web/all/top/BTmTopEnglishPage. (Year: 2018).*

*Primary Examiner* — Jason S Daniels
(74) *Attorney, Agent, or Firm* — McDonnell Boehnen Hulbert & Berghoff LLP (57) ABSTRACT

The present invention provides a hood for a vehicle, the hood including an outer panel and an inner panel. The outer panel is made of a first composite material and has a multi-layered structure formed by stacking a plurality of reinforcing fiber layers arranged in a predetermined direction. The inner panel is made of a second composite material, has a multi-layered structure formed by stacking a plurality of reinforcing fiber layers in a predetermined direction, and is combined with the outer panel. The rein-
(Continued)

forcing fibers of at least a pair of reinforcing fiber layers facing each other of the outer panel and of the inner panel are arranged in the same direction and form a predetermined angle with a virtual line extending through both longitudinal ends of the outer panel or the inner panel.

10 Claims, 6 Drawing Sheets

(51) Int. Cl.
*B60R 21/34* (2011.01)
*B62D 25/12* (2006.01)
*B62D 29/04* (2006.01)
*B29L 31/30* (2006.01)
*B60R 21/00* (2006.01)

(52) U.S. Cl.
CPC ........ *B62D 29/043* (2013.01); *B29L 2031/30* (2013.01); *B60R 2021/0048* (2013.01); *B60R 2021/343* (2013.01)

(58) Field of Classification Search
USPC .................................................... 296/193.11
See application file for complete search history.

(56) References Cited

FOREIGN PATENT DOCUMENTS

| | | | | |
|---|---|---|---|---|
| DE | 102014218226 A1 | * | 3/2016 | ............... B32B 5/26 |
| JP | 2005-125883 A | | 5/2005 | |
| JP | 2014201110 A | | 10/2014 | |
| KR | 10-20060067228 A | | 6/2006 | |
| KR | 2008-0069237 A | | 7/2008 | |

* cited by examiner

HOOD FOR VEHICLE AND MANUFACTURING METHOD OF THE SAME

CROSS REFERENCE TO RELATED APPLICATION

The present application claims priority to Korean Patent Application No. 10-2016-0127356, filed Oct. 4, 2016, the entire contents of which is incorporated herein for all purposes by this reference.

BACKGROUND

Field of the Invention

The present invention relates to a hood for a vehicle made of a composite material including a reinforcing fiber and resin.

Description of the Related Art

Metal such as steel and aluminum is generally used for the hoods of vehicles. As it has become necessary to reduce the weight of vehicles with the enhancement of environmental regulations around the world, the metallic materials used for parts of vehicles have been replaced by light composite materials, and particularly, carbon fiber-reinforced plastic (CFRP) is used as a composite material for vehicles due to its light weight, high specific strength, and high specific rigidity.

However, the mechanical properties of CFRP may be advantageous in terms of rigidity, but are not advantageous in terms of the safety of pedestrians. Due to the high rigidity of CFRP, when a vehicle collides with a pedestrian, the pedestrian may injured due to a high HIC (Head Injury Criterion). As a result, CFRP cannot be directly applied to the hoods of vehicles.

This problem can be solved by changing the mechanical properties of CFRP by making the stacking angles of carbon fiber layers different and by making desired hood shapes through optimization of topometry. Accordingly, it is possible to secure mechanical properties that fit the design objectives and reduce HIC by optimizing the stacking angle of a carbon fiber array and topometry.

The foregoing is intended merely to aid in the understanding of the background of the present invention, and is not intended to mean that the present invention falls within the purview of the related art that is already known to those skilled in the art.

SUMMARY

An object of the present disclosure is to provide a hood for a vehicle that provides improved safety for pedestrians by adjusting the stacking angle of a plurality of carbon fiber layers constituting an outer panel and an inner panel of a vehicle hood.

In order to achieve the objects of the present disclosure, a hood for a vehicle according to an aspect of the present disclosure includes: an outer panel made of a first composite material and having a multi-layered structure formed by stacking a first plurality of reinforcing fiber layers arranged in a predetermined direction, and an inner panel, which is made of a second composite material, has a multi-layered structure formed by stacking a second plurality of reinforcing fiber layers in a predetermined direction, and is combined with the outer panel, in which in each of the outer panel and inner panel, the reinforcing fibers of at least a pair of reinforcing fiber layers facing each other are arranged in the same predetermined direction and form a predetermined angle with respect to a virtual line extending through both longitudinal ends of the outer panel or the inner panel.

The angle formed by the reinforcing fibers of a pair of reinforcing fiber layers facing each other and the virtual line S may be 75+a°, wherein "a" is a value between −5 and 5.

A pair of reinforcing fiber layers facing each other may be a reference pair at the center layer of the outer panel and of the inner panel and the reinforcing layers above and below the reference pair may make a pair, so a multi-layered structure may be formed by a plurality of pairs of reinforcing fiber layers, with the reference pair at the center.

Odd-numbered pairs of reinforcing fibers stacked above and below the reference pair may be arranged in the same direction and are repeatedly stacked to form an angle of −75+a° with respect to the virtual line S, and even-numbered pairs of reinforcing fibers stacked above and below the reference pair may be arranged in the same direction and are repeatedly stacked to form an angle of −75+a° with respect to the virtual line.

A hole may be defined in the center of the inner panel, the hole having a semi-elliptical shape. The curved portion of the hole may face the front end of the inner panel, and the shorter radius of the semi-elliptical hole may be parallel to the virtual line.

When a distance between one side of the inner panel to the other side of the inner panel is d1 and a distance between a front end and a rear end of the inner panel is d2, the longer radius of the semi-ellipse may be in the range of 0.34d1-0.38d1 and the shorter radius of the semi-ellipse may be in the range of 0.51d2-0.55d2.

A method of manufacturing a hood for a vehicle according to another aspect of the present disclosure includes: forming an outer panel by stacking a first plurality of reinforcing fiber layers arranged in a predetermined direction and then injecting resin; forming an inner panel by stacking a second plurality of reinforcing fiber layers arranged in a predetermined direction and then injecting resin; and assembling the outer panel and the inner panel, so that at least one pair of reinforcing fiber layers facing each other of the outer panel and the inner panel is arranged in the same predetermined direction and forms a predetermined angle with a virtual line extending through both ends of the outer panel or the inner panel.

In each forming step, stacking a plurality of reinforcing fiber layers so that a pair of reinforcing fiber layers facing each other may be a reference pair at the center layer of the outer panel and of the inner panel and the reinforcing layers above and below the reference pair may make a pair, so a multi-layered structure may be formed by stacking a plurality of pairs of reinforcing fiber layers with the reference pair at the center.

The method may further include a machining step of forming a semi-elliptical hole in the center of the inner panel.

According to the hood for a vehicle of the present disclosure, the reinforcing fibers of the reinforcing fiber layers constituting the outer panel and the inner panel, which have a multi-layered structure, are arranged in predetermined directions, so the HIC is reduced and safety for pedestrians can be improved.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinafter, exemplary embodiments of the present disclosure will be described in detail with reference to the accompanying drawings.

A hood for a vehicle according to the present disclosure includes: an outer panel 100 made of a first composite material and having a multi-layered structure formed by stacking a plurality of reinforcing fiber layers arranged in a predetermined direction, and an inner panel 200 made of a second composite material, having a multi-layered structure formed by a plurality of reinforcing fiber layers stacked in a predetermined direction, and combined with the outer panel 100. The reinforcing fibers of at least a pair of reinforcing fiber layers of the outer panel 100 and the inner panel 200 facing each other are arranged in the same direction and form a predetermined angle with a virtual line S connecting both longitudinal ends of the outer panel 100 or the inner panel 200.

Figure 1:
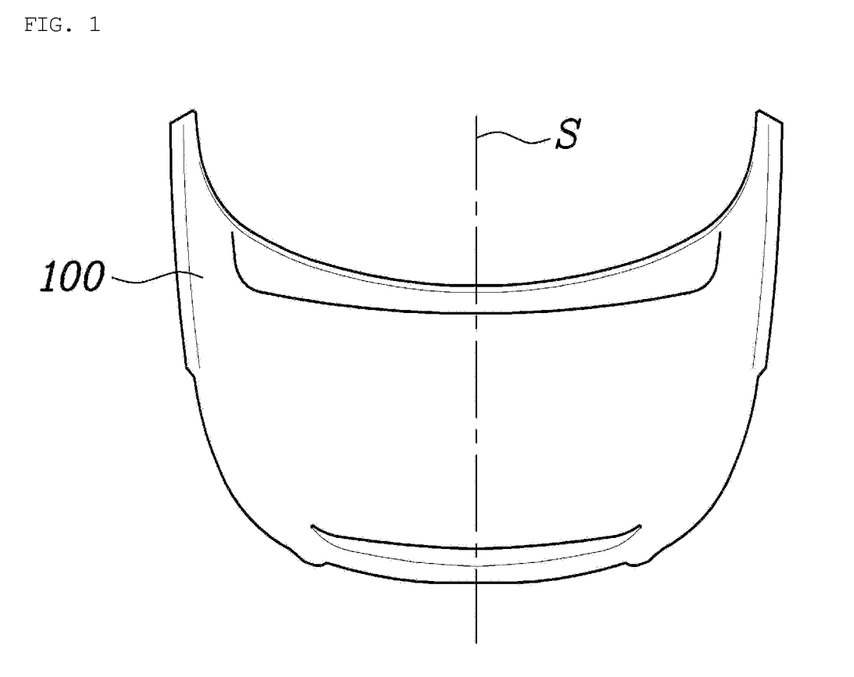
FIG. 1 is a diagram showing an outer panel according to an embodiment of the present disclosure.

As shown in FIG. 1, the outer panel 100, which is a panel forming the hood of a vehicle and is exposed on the outside of a car body, has a first outer side and a second inner side. In the outer panel 100 having a multi-layered structure composed of a plurality of stacked reinforcing fiber layers, the reinforcing layers are sheet-shaped layers arranged in a predetermined direction. Further, the reinforcing fibers may be made of at least one of the following: carbon fiber, glass fiber, aramid fiber, or natural fiber. However, the reinforcing fibers are not limited to the listed materials.

The inner panel 200 is combined with the outer panel 100 to form the hood of a vehicle, and may be coupled to the second inner side of the outer panel 100. Similar to the outer panel 100, in the inner panel 200 having a multi-layered structure composed of a plurality of stacked reinforcing fiber layers, the reinforcing layers are sheet-shaped layers arranged in a predetermined direction. Further, the reinforcing fibers may be made of at least one of the following: carbon fiber, glass fiber, aramid fiber, or natural fiber. However, the reinforcing fibers are not limited to the listed materials. The thickness of each of the reinforcing fiber layers may be in the range of 0.15-0.30 mm.

In the outer panel 100 and the inner panel 200 each having a multi-layered structure of a plurality of reinforcing fiber layers, the reinforcing fibers in pairs of reinforcing fiber layers facing each other are arranged in the same direction. Further, the reinforcing fibers of pairs of reinforcing fiber layers facing each other may be arranged so as to form a predetermined angle with a virtual line S connecting both longitudinal ends of the outer panel 100 or the inner panel 200. The stacking angles of the reinforcing fiber layers are determined in this way.

The longitudinal direction of the outer panel 100 or the inner panel 200 is set with respect to the car body. When the outer panel 100 and the inner panel 200 are formed into a hood for a vehicle and mounted on a vehicle, the longitudinal direction of the car body may correspond to the longitudinal direction of the outer panel 100 or the inner panel 200.

Preferably, the angle formed by the reinforcing fibers of a pair of reinforcing fiber layers facing each other and the virtual line S may be 75+a°. In this case, 'a' may be a number between −5 and 5.

The reinforcing fiber layers are configured in a Uni-Directional ("UD") type having reinforcing fibers arranged in a predetermined direction and may form an angle of 75+a° with the virtual line S connecting both longitudinal ends of the reinforcing fibers, the outer panel 100, or the inner panel 200. Since 'a' is a number between −5 and 5, the angle may be in the range of 70° to 80°.

Figure 2:
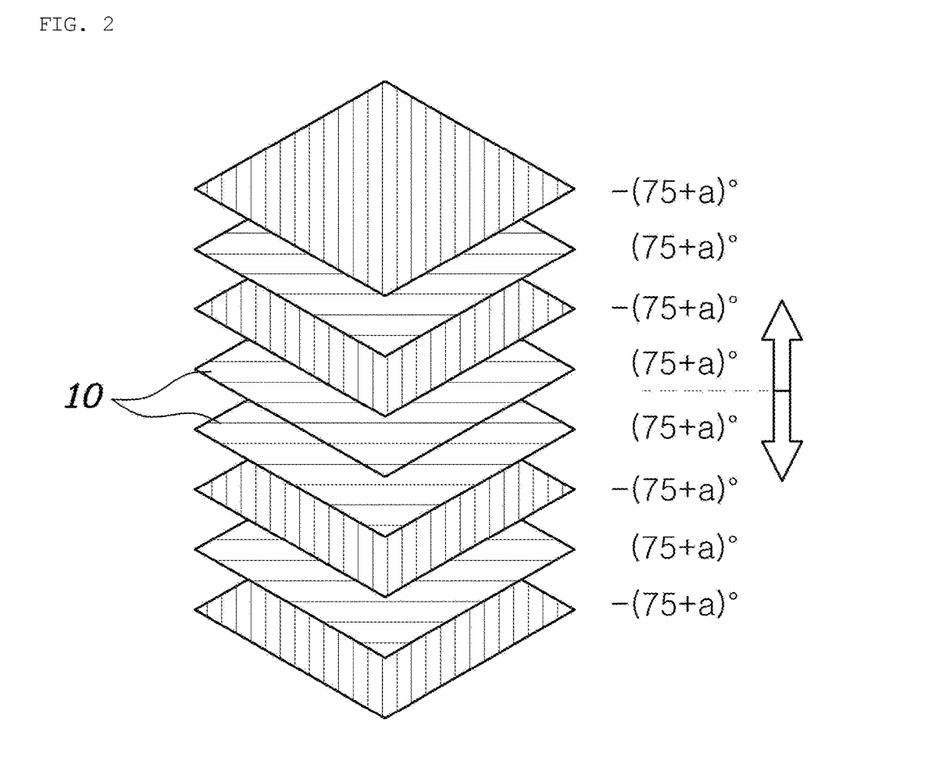
FIG. 2 is a diagram showing the stacking angles of carbon fiber layers according to an embodiment of the present disclosure.

Referring to FIG. 2, a pair of reinforcing fiber layers facing each other is a reference pair 10 at the center layer of the outer panel 100 and the inner panel 200. The reinforcing layers above and below the reference pair 100 make a pair, so a multi-layered structure can be formed by a plurality of pairs of reinforcing fiber layers, with the reference pair 10 at the center.

The center layer may comprise a pair of reinforcing fiber layers facing each other and stacked at the center in the multi-layered structure of the outer layer 100 and the inner layer 200. Accordingly, the pair of reinforcing fiber layers facing each other at the center layer is the reference pair 10. The layers above and below the reference pair 10 form a pair and the layers above and below those layers form another layer. Thus, a multi-layered structure of a plurality of pairs of reinforcing fiber layers can be achieved by repeatedly stacking reinforcing fiber layers in this way.

The odd-numbered pairs of reinforcing fibers stacked above and below the reference pair 10 may be arranged in the same direction, and may be repeatedly stacked to form an angle of −75+a° with the virtual line S. The even-numbered pairs of reinforcing fibers stacked above and below the reference pair 10 may be arranged in the same direction, and may be repeatedly stacked to form an angle of −75+a° with the virtual line S.

For example, the first pair of reinforcing fibers, stacked above and below the reference pair 10, may be arranged in the same direction and form an angle of −75+a° with the virtual line S. The second pair of reinforcing fibers, stacked over and under the first pair, may be arranged in the same direction and form an angle of −75+a°. Reinforcing fiber layers can be repeatedly stacked in this way.

A reinforcing fiber layer of the outer panel 100 or the inner panel 200 may have a different angle from the reinforcing fiber layers above and below it.

Embodiments of a hood for a vehicle according to the present disclosure, comparative examples made of metallic materials, and comparative examples in which reinforcing fiber layers are stacked such that reinforcing fibers are arranged in different direction are compared in Table 1 that follows.

TABLE 1

| | Stacking angle of reinforcing fiber | | | Mass |
| --- | --- | --- | --- | --- |
| | Outer panel | Inner panel | HIC | (kg) |
| Embodiment 1 | 75/−75/75/−75 | 75/−75/75/−75 | 1154 | 6.76 |
| Embodiment 2 | 80/−70/80/−70 | 80/−70/80/−70 | 1092 | 6.76 |
| Comparative example 1 | — | — | 1279 | 13.37 |

TABLE 1-continued

| | Stacking angle of reinforcing fiber | | HIC | Mass (kg) |
|---|---|---|---|---|
| | Outer panel | Inner panel | | |
| Comparative example 2 | — | — | 1266 | 7.10 |
| Comparative example 3 | 45/−45/45/−45 | 45/−45/45/−45 | 2705 | 6.76 |
| Comparative example 4 | 45/−45/0/90 | 45/−45/0/90 | 2406 | 6.76 |

Figure 4:
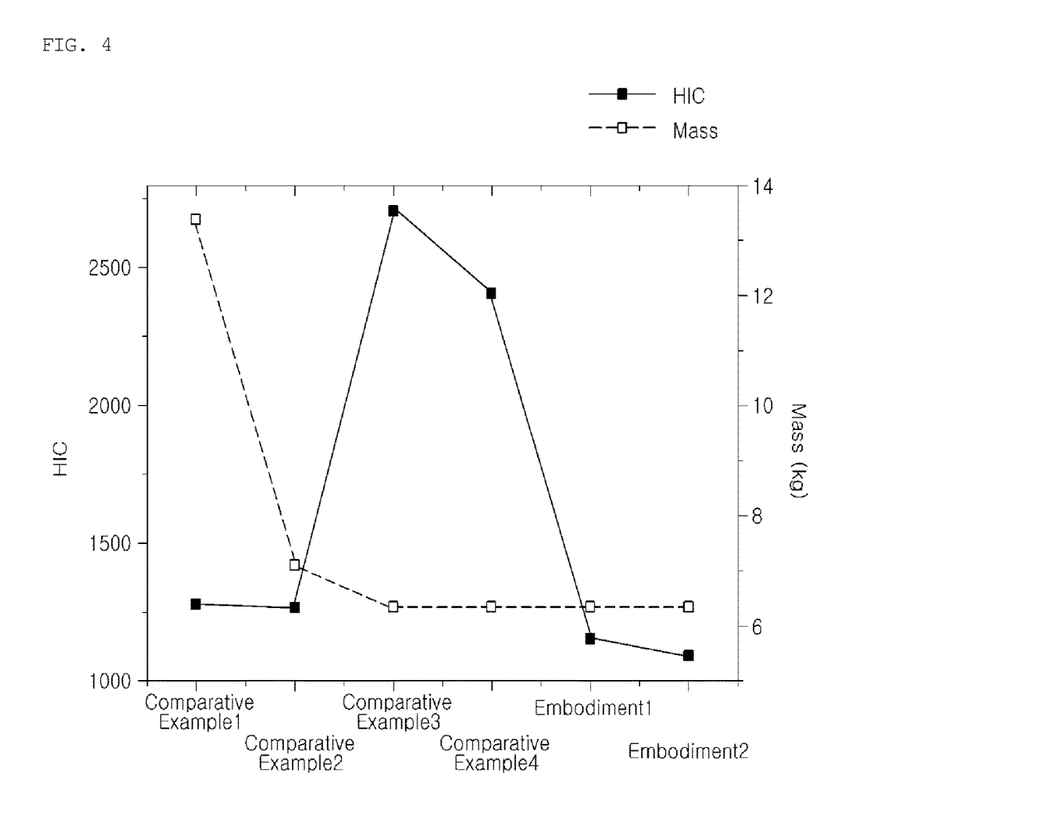
FIG. 4 is a graph showing an HIC and mass in embodiments and comparative examples.

The comparison of HIC and weight in embodiments and comparative examples is shown in Table 1 and FIG. 4. The HIC, which is an abbreviation of "Head Injury Criterion", is expressed by a value showing the shock that may be applied to the head of a pedestrian when a vehicle hits the pedestrian. The lower the HIC, the safer the pedestrian is.

In Embodiment 1, with respect to the stacking angle of 75° of a reference pair, the first pair, second pair, and third pair were respectively stacked at −75°, 75°, and −75°. In Embodiment 2, with respect to the sacking angle of 80° of a reference pair, the first pair, second pair, and third pair were respectively stacked at −70°, 80°, and −70°.

In Comparative Example 1, the hood of a vehicle was made of steel. Not only is the HIC high for this example, but the weight is high due to the characteristics of the material, as compared with Embodiments 1 and 2. In Comparative Example 2, the hood of a vehicle was made of aluminum. Not only is the HIC high for this example, but the weight is high, even though the material is lightweight metal, as compared with Embodiments 1 and 2.

Figure 3A:
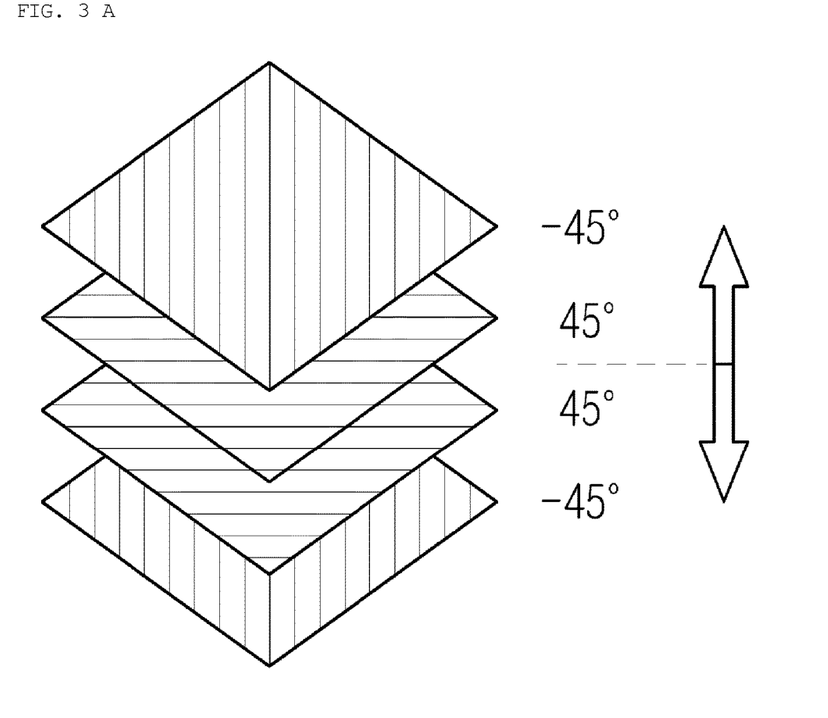
FIGS. 3A and 3B are diagrams showing stacking angles of carbon fiber layers in comparative examples.

As shown in FIG. 3A, reinforcing fiber layers were stacked in a perpendicular stacking manner in Comparative Example 2, in which, with respect to the stacking angle of 45° of a reference pair, the first pair, second pair, and third pair were respectively stacked at −45°, 45°, and −45°. A reinforcing fiber layer may have an angle difference of 90° from the reinforcing layers above and below it. As can be seen from Table 1 and FIG. 4, the HIC is very high when compared with Embodiments 1 and 2.

Figure 3B:
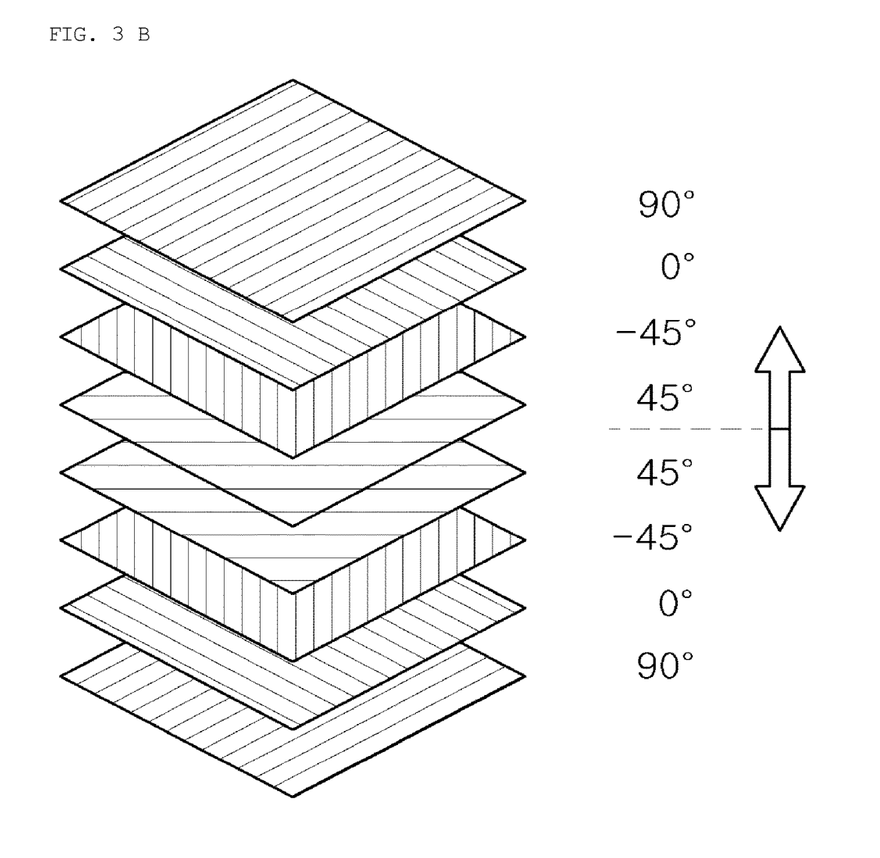

As shown in FIG. 3B, reinforcing fiber layers were stacked in a quasi-isotropic manner in Comparative Example 4, in which, with respect to the stacking angle of 45° of a reference pair, the first pair, second pair, and third pair were respectively stacked at −45°, 0°, and 90°. As can be seen from Table 1 and FIG. 4, the HIC is very high compared with Embodiments 1 and 2.

The hood of a vehicle must necessarily be designed with safety in mind because it may directly collide with a pedestrian. With a vehicle hood composed of a composite material consistent with the disclosure, reinforcing fiber layers are stacked at different angles, making it possible to reduce the HIC in comparison to vehicle hoods made of metal.

Figure 5:
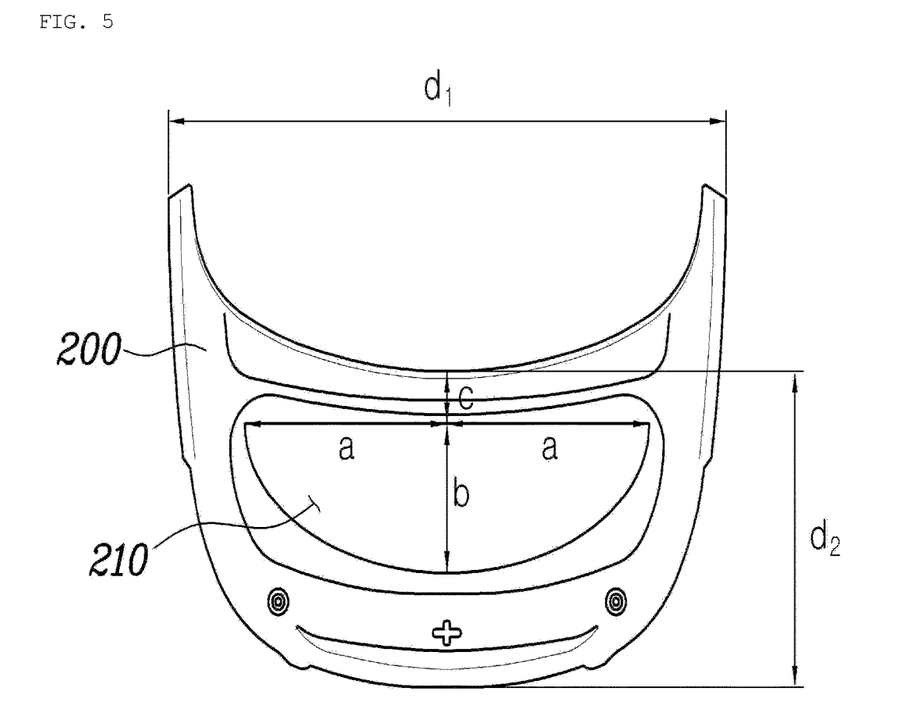
FIG. 5 is a diagram showing an inner panel according to an embodiment of the present disclosure.

Referring to FIG. 5, preferably, a semi-elliptical hole 210 is defined in the center of the inner panel 200. More preferably, the curved portion of the hole 210 may face the front of the hood or the vehicle, and the shorter radius of the semi-ellipse may be parallel to the virtual line S.

By applying optimization by topometry that designates elements for parts around the hole 210 of the inner panel 200 and obtains the thickness distribution of the elements with their thickness as variables, the semi-elliptical portion at the center of the inner panel 200 was shown as unnecessary. Accordingly, the hole 210 with the curved portion facing the front of the hood or vehicle, the longer radius parallel to the width direction of the inner panel 200 and the shorter radius parallel to the virtual line can be formed at the center of the inner panel 200.

The HIC is maintained, but a reduction in weight is anticipated due to the hole 210.

When the distance between one side of the inner panel to the other side of the inner panel is d1 and the distance between a front end and a rear end of the inner panel 200 is d2, the longer radius 'a' of the semi-ellipse may be in the range of 0.34d1-0.38d1 and the shorter radius 'b' of the semi-ellipse may be in the range of 0.51d2-0.55d2.

The distance 'c' from the center of the hole 210 to the center of the rear end of the inner panel 200 may be in the range of 0.15d2-0.19d2.

When the longer radius 'a' of the semi-ellipse is less than 0.34d1, the weight reduction is not large and it is not beneficial to form the hole 201. When the longer radius 'a' of the semi-ellipse is larger than 0.38d1, however, the hole 210 becomes too large and the overall rigidity of the hood of a vehicle may be reduced. Accordingly, it is preferable to limit the longer radius 'a' of the semi-ellipse within the range of 0.34d1-0.38d1.

When the shorter radius 'b' of the semi-ellipse is less than 0.51d2, similarly, the weight reduction is not large and it is not beneficial to form the hole 201. When the shorter radius 'b' of the semi-ellipse is larger than 0.55d2, however, the hole 210 becomes too large and the overall rigidity of the hood of a vehicle may be reduced. Accordingly, it is preferable to limit the shorter radius 'b' of the semi-ellipse within the range of 0.51d2-0.55d2.

A method of manufacturing a hood for a vehicle according to the present invention includes: forming the outer panel 100 by stacking a plurality of reinforcing fiber layers in a predetermined direction; injecting resin into a mold; forming the inner panel 200 by stacking a plurality of reinforcing fiber layers in a predetermined direction; injecting resin into a mold; and assembling the outer panel 100 and the inner panel 200 so that at least one pair of reinforcing fiber layers facing each other of the outer panel 100 and the inner panel 200 is arranged in the same direction and forms a predetermined angle with a virtual line S connecting the longitudinal ends of the outer panel 100 or of the inner panel 200.

In the forming steps, a plurality of reinforcing fiber layers is stacked so that a pair of reinforcing fiber layers facing each other is a reference pair 10 at a center layer of the outer panel 100 and the inner panel 200 and the reinforcing layers above and below the reference pair 100 make a pair. Thus, a multi-layered structure can be formed by stacking a plurality of pairs of reinforcing fiber layers with the reference pair 10 at the center.

In forming the outer panel, a plurality of reinforcing fiber layers, that is, prefoams or prepregs, is stacked in a mold so that a pair of reinforcing fiber layers facing each other forms a predetermined angle with the virtual line S connecting both ends of the outer panel 100. Preferably, a pair of reinforcing fiber layers facing each other is stacked at a center layer of the outer panel 100 to serve as the reference pair 10, and a plurality of reinforcing fiber layers is stacked above and below the reference pair 10, thereby forming the outer panel 100.

Similarly, in forming the inner panel, a plurality of reinforcing fiber layers, that is, prefoams or prepregs, is stacked in a mold so that a pair of reinforcing fiber layers facing each other forms a predetermined angle with the virtual line S connecting both ends of the inner panel 200.

Preferably, a pair of reinforcing fiber layers facing each other is stacked at the center layer of the inner panel 200 to serve as the reference pair 10 and a plurality of reinforcing fiber layers is stacked above and below the reference pair 10, thereby forming the inner panel 200.

Thereafter, the outer panel 100 and the inner panel 200 are combined, thereby completing a hood for a vehicle.

The method may further include a step of forming the semi-elliptical hole 210 in the center of the inner panel 200. The hole 210 may be machined or made by another suitable process.

In the step of forming the semi-elliptical hole, the semi-elliptical hole 210 may be formed in the center of the inner panel 200 by trimming. Accordingly, it is possible to reduce the weight in the hood of a vehicle, while maintaining the HIC.

Although the present invention was described with reference to specific embodiments shown in the drawings, it is apparent to those skilled in the art that the present disclosure may be changed and modified in various ways without departing from the scope of the present disclosure, which is described in the following claims.

What is claimed is:

1. A hood for a vehicle, comprising:
    an outer panel made of a first composite material and comprising a multi-layered structure formed by stacking a first plurality of reinforcing fiber layers arranged in a predetermined direction; and
    an inner panel made of a second composite material, comprising a multi-layered structure formed by stacking a second plurality of reinforcing fiber layers in a predetermined direction,
    wherein, in each of the outer panel and inner panel, reinforcing fibers of at least a pair of reinforcing fiber layers facing each other are arranged in the same predetermined direction and form a predetermined angle with respect to a virtual line extending through longitudinal ends of the respective panel; and
    wherein the angle formed by the reinforcing fibers of at least the pair of reinforcing fiber layers facing each other and the virtual line is 75+a° , wherein "a" is a value between −5 and 5.

2. The hood of claim 1, wherein a pair of reinforcing fiber layers facing each other is a reference pair at a center layer of the outer panel and of the inner panel, the reinforcing layers above and below the reference pair comprise a first pair, the reinforcing layers above and below the first pair comprise a second pair, and the reinforcing layers above and below the second pair comprise a third pair.

3. The hood of claim 2, wherein odd-numbered pairs of reinforcing fibers stacked above and below the reference pair are arranged in the same direction and are repeatedly stacked to form an angle of −75+a° with respect to the virtual line, and
    even-numbered pairs of reinforcing fibers stacked above and below the reference pair are arranged in the same direction and are repeatedly stacked to form an angle of 75+a° with respect to the virtual line.

4. The hood of claim 1, wherein a hole is defined in a center of the inner panel, the hole having a semi-elliptical shape.

5. The hood of claim 4, wherein a curved portion of the semi-elliptical hole faces a front end of the inner panel and a shorter radius of the semi-elliptical hole is parallel to the virtual line.

6. The hood of claim 5, wherein when a distance between one side of the inner panel to the other side of the inner panel is d1 and a distance between a front end and a rear end of the inner panel is d2, a longer radius of the semi-ellipse is the range of 0.34d1-0.38d1, and a shorter radius of the semi-ellipse is in the range of 0.51d2-0.55d2.

7. The hood of claim 1, wherein the first composite material and the second composite material are the same.

8. A method of manufacturing a hood for a vehicle, the method comprising:
    forming an outer panel by stacking a first plurality of reinforcing fiber layers arranged in a predetermined direction;
    injecting resin;
    forming an inner panel by stacking a second plurality of reinforcing fiber layers arranged in a predetermined direction;
    injecting resin; and
    assembling the outer panel and the inner panel so that at least one pair of reinforcing fiber layers facing each other of the outer panel and the inner panel is arranged in the same predetermined direction and forms a predetermined angle with a virtual line extending through both ends of the outer panel or the inner panel; and
    wherein the angle formed by the reinforcing fibers of at least the pair of reinforcing fiber layers facing each other and the virtual line is 75+a° , wherein "a" is a value between −5 and 5.

9. The method of claim 8, wherein in each forming step, stacking a plurality of reinforcing fiber layers so that a pair of reinforcing fiber layers facing each other is a reference pair at a center layer of the outer panel and of the inner panel and the reinforcing fiber layers above and below the reference pair comprise a pair.

10. The method of claim 8, further comprising forming a semi-elliptical hole in a center of the inner panel.

* * * * *